(12) United States Patent
Wong et al.

(10) Patent No.: US 10,099,370 B2
(45) Date of Patent: Oct. 16, 2018

(54) DRIVER DEVICE FOR ELECTRIC GRIPPER AND DRIVING METHOD THEREOF

(71) Applicant: HIWIN TECHNOLOGIES CORP., Taichung (TW)

(72) Inventors: Chen-Ming Wong, Taichung (TW); Wei-Shao Chen, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 320 days.

(21) Appl. No.: 15/069,058

(22) Filed: Mar. 14, 2016

(65) Prior Publication Data

US 2017/0259429 A1    Sep. 14, 2017

(51) Int. Cl.
*B25J 9/16* (2006.01)
*B25J 15/02* (2006.01)

(52) U.S. Cl.
CPC ........... *B25J 9/1612* (2013.01); *B25J 9/1694* (2013.01); *B25J 15/02* (2013.01)

(58) Field of Classification Search
CPC ...................................................... B25J 15/02
USPC .................... 318/568.11, 568.1, 567, 560
See application file for complete search history.

(56) References Cited

U.S. PATENT DOCUMENTS

| | | | |
|---|---|---|---|
| 6,718,533 B1* | 4/2004 | Schneider | G06F 8/10 700/97 |
| 8,983,786 B2* | 3/2015 | Pecher | B25J 9/1692 702/89 |
| 9,537,439 B2* | 1/2017 | Grossmann | H02P 21/50 |

* cited by examiner

*Primary Examiner* — David S Luo
(74) *Attorney, Agent, or Firm* — Muncy, Geissler, Olds & Lowe, P.C.

(57) ABSTRACT

A driving method used in a driver device for driving an electric gripper is disclosed to include the step of providing a state signal that is generated according to the operation state of the electric gripper, the step of receiving an action instruction and detecting a feedback signal indicative of the action of the electric gripper when the state signal is an idle state, and the step of outputting the action instruction if the action of the electric gripper indicative of the action instruction is not in consistency with the action of the electric gripper indicative of the feedback signal. Thus, the driving method of the present invention needs not to provide a trigger signal for commanding the electric gripper to execute the action instruction.

6 Claims, 5 Drawing Sheets

DRIVER DEVICE FOR ELECTRIC GRIPPER AND DRIVING METHOD THEREOF

BACKGROUND OF THE INVENTION

1. Field of the Invention

The present invention relates to electric gripper driving technology and more particularly, to a driver device for driving an electric gripper to execute an action instruction without giving a trigger signal to the electric gripper. The invention relates also to a driving method used in the driver device for driving the electric gripper.

2. Description of the Related Art

With the development of industrial automation, electric gripper applications and demands keep increasing. A conventional method for driving an electric gripper is achieved by means of enabling a driver device to receive an action instruction present or inputted by the user. However, before executing the operation instruction, the driver device will receive a trigger signal, so the driver device can output the action instruction to the electric gripper, causing the electric gripper to change the direction of action.

This conventional electric gripper driving method not only complicates the circuit traces of the driver device but also can easily lead to a malfunction of the electric gripper, for example, the electric gripper receives a new action instruction when executing an action, or the electric gripper is commanded to execute the action of "open" or "close" after executed the same action.

SUMMARY OF THE INVENTION

The present invention has been accomplished under the circumstances in view. It is the main object of the present invention to provide a driver device and a driving method applied to the driver device for driving an electric gripper to execute an action instruction without giving a trigger signal to the electric gripper, which employs an integrated logic decision based on a state signal indicative of the operation state of the electric gripper, an action instruction and a feedback signal for controlling the electric gripper to execute a new action without, ensuring that the electric gripper is idling and the new action instruction is different from the current operation state of the electric gripper, and thus, the driver device needs not to be equipped with an electric gripper trigger circuit.

To achieve this and other objects of the present invention, a driving method used in a driver device for driving an electric gripper includes the step of providing a state signal that is generated according to the operation state of the electric gripper, and then the step of receiving an action instruction and detecting a feedback signal indicative of the action of the electric gripper when the state signal is an idle state, and then the step of outputting the action instruction if the action of the electric gripper indicative of the action instruction is not in consistency with the action of the electric gripper indicative of the feedback signal.

To achieve this and other objects of the present invention, a driver device for driving an electric gripper comprises a logic unit and a processing unit. The logic unit comprises a state detection end, an instruction input end, a feedback end and a logic output end. The state detection end is adapted for generating a state signal according to the operation state of the electric gripper. The instruction input end is adapted for receiving an action instruction for driving the electric gripper to perform an action. The processing unit comprises two input ends and an output end. The two input ends of the processing unit are respectively electrically coupled to the instruction input end and logic output end of the logic unit. The output end of the processing unit is electrically coupled to the feedback end of the logic unit. The feedback end of the logic unit is adapted for generating a feedback signal according to the action of the electric gripper. The processing unit outputs the action instruction when the state signal is indicative of an idle state of the electric gripper and when the logic unit judges that the action of the electric trigger indicative of the feedback signal is not in consistency with the action of the electric gripper indicative of the action instruction.

Thus, the driver device and the driving method of the invention do not need to provide trigger signal related circuit and logics.

Other advantages and features of the present invention will be fully understood by reference to the following specification in conjunction with the accompanying drawings, in which like reference signs denote like components of structure.

DETAILED DESCRIPTION OF THE INVENTION

Figure 1:
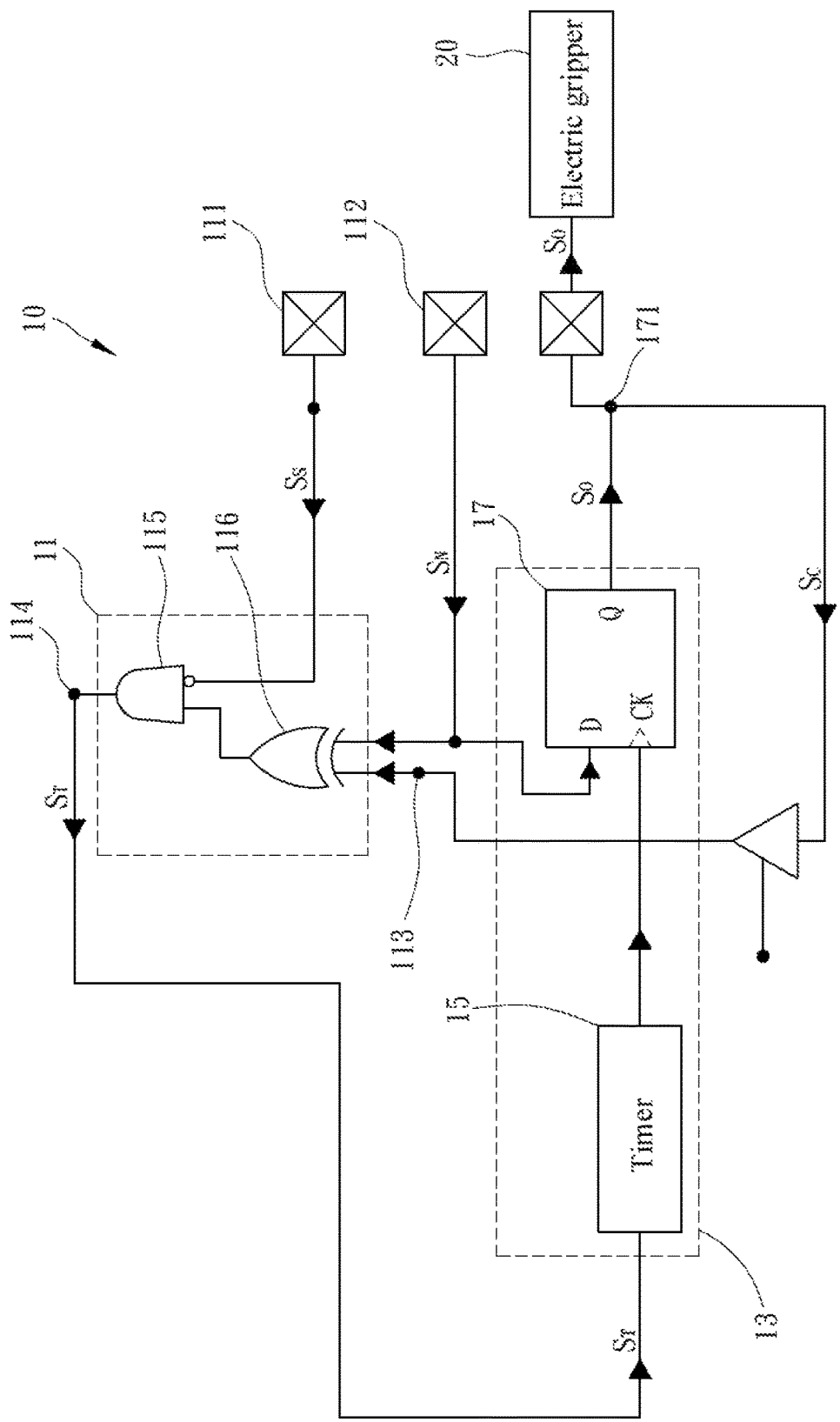
FIG. 1 is a circuit block diagram of the combination of an electric gripper and a driver device in accordance with the present invention.

Referring to FIG. 1, a driver device 10 for driving an electric gripper 20 in accordance with the present invention is shown. The driver device 10 comprises a logic unit 11 and a processing unit 13. In this embodiment, the processing unit 13 comprises a timer 15 and a flip-flop 17.

Figure 2:
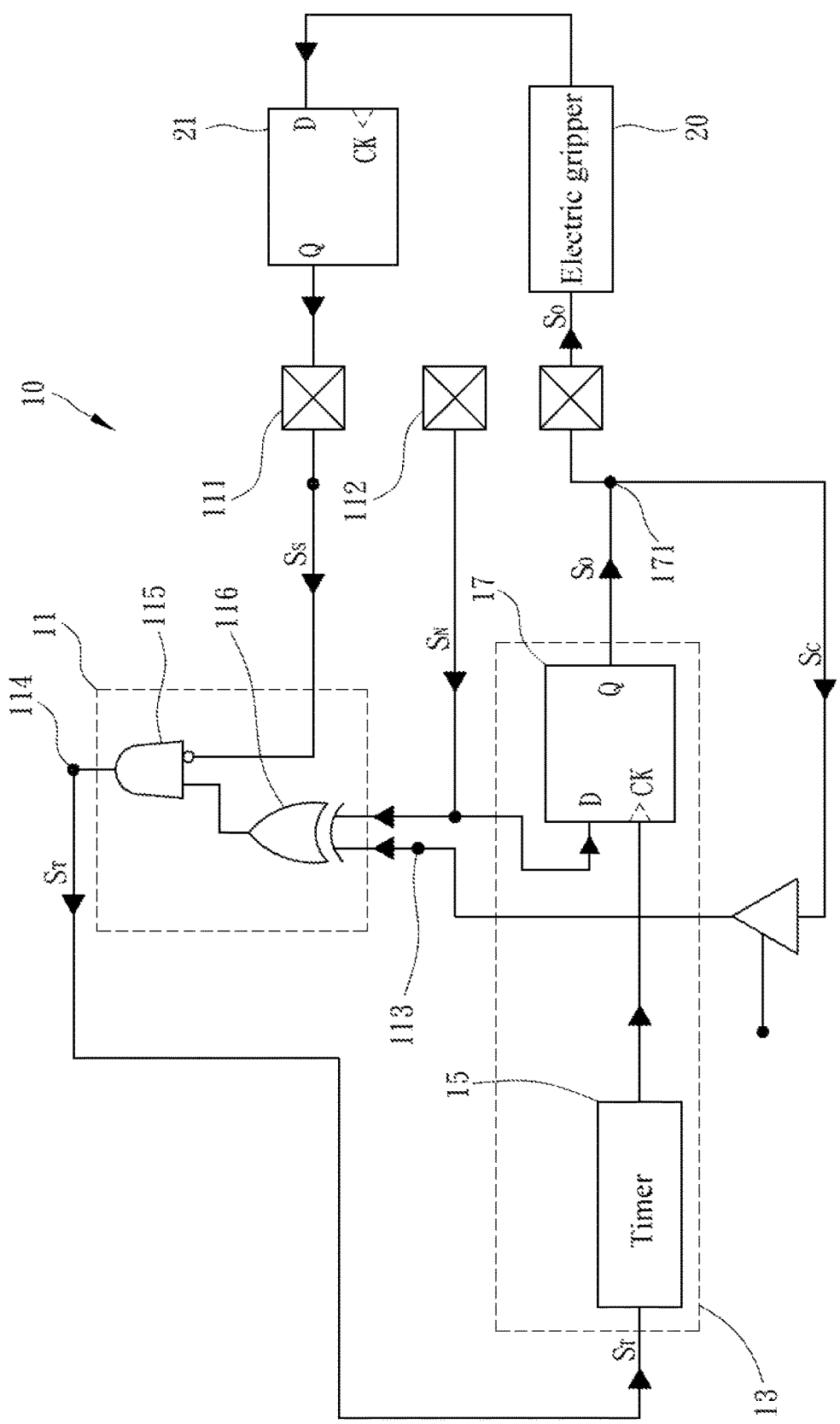
FIG. 2 is a circuit block diagram of the combination of an electric gripper, a flip-flop and a driver device in accordance with the present invention.

The logic unit 11 comprises a state detection end 111, an instruction input end 112, a feedback end 113 and a logic output end 114. The state detection end 111 is adapted for generating a state signal $S_S$ according to an operation state of the electric gripper 20. In practice, as shown in FIG. 2, the state detection end 111 can obtain the operation state of the electric gripper 20 through a flip-flop 21, and then generate this state signal $S_S$. However, the state signal $S_S$ can be generated in any other known method, and therefore, the method illustrated in FIG. 2 is not a limitation. Further, the operation state of the electric gripper 20 can be an operation state where the electric gripper 20 is executing the action plan of an instruction, or an idle state where the electric gripper 20 does no work or has finished the execution of an instruction. The instruction input end 112 is adapted for receiving an action instruction $S_N$. The action instruction $S_N$ is an instruction pre-planned by the driver device 10 or inputted into the driver device 10 by the operator for driving the electric gripper 20 to perform action.

Referring to FIG. 1 again, the timer 15 comprises an input end and an output end. The input end of the timer 15 is electrically coupled to the logic output end 114 of the logic unit 11.

The flip-flop 17 comprises two input ends and an instruction output end 171. The two input ends of the flip-flop 17 are respectively electrically coupled to the instruction input end 112 of the logic unit 11 and the output end of the timer 15. The instruction output end 171 of the flip-flop 17 is electrically coupled to the feedback end 113 of the logic unit 11. The feedback end 113 of the logic unit 11 generates a feedback signal $S_C$ according to an action of the electric gripper 20.

If the state signal $S_S$ generated by the logic unit 11 is indicative of an idle state of the electric gripper 20, the logic unit 11 compares and judges the feedback signal $S_C$ and the action instruction $S_N$ to be in consistency with the actions of the electric gripper 20 or not. The procedure of judging the consistency of the action corresponding to the feedback signal $S_C$ and the action corresponding to the action instruction $S_N$ is explained hereinafter. If the feedback signal $S_C$ indicates the action of the electric gripper 20 to be "open" (or "close") and the action of the electric gripper 20 corresponding to the action instruction $S_N$ is "close" (or "open"), the result of the judgment is non-consistency; on the contrary, if the action of the electric gripper 20 corresponding to the feedback signal $S_C$ and the action of the electric gripper 20 corresponding to the action instruction $S_N$ both are "open" (or "close"), the result of the judgment is consistency.

If the result of the judgment is consistency, the logic unit 11 will not trigger the timer 15 and flip-flop 17 of the processing unit 13, in other words, the processing unit 13 will not output the action instruction $S_O$.

If the result of the judgment is non-consistency, the logic output end 114 of the logic unit 11 will output a timing trigger signal $S_T$ to the timer 15, driving the timer 15 to start counting a predetermined length of time, and then to trigger the flip-flop 17 when the predetermined length of time counted by the timer 15 is up. When the flip-flop 17 is triggered by the timer 15, it immediately receives a new action instruction $S_N$ from the instruction input end 112 and then outputs this new action instruction $S_O$ to the instruction output end 171, causing the electric gripper 20 to change the direction of action according to this new action instruction $S_O$.

In this embodiment, the logic unit 11 comprises an AND gate 115 and an XOR gate 116. The output end of the AND gate 115 is the logic output end 114 of the logic unit 11. One input end of the AND gate 115 is electrically coupled to the output end of the XOR gate 116. The other input end of the AND gate 115 is the state detection end 111 of the logic unit 11. In this embodiment, the other input end of the AND gate 115 has an inverter therein for inverting the level of the state signal $S_S$, however, in actual practice, if the logic judging method is changed, the inverter can be omitted, and thus, the design that the other input end of the AND gate 115 has an inverter therein is not a limitation. The two input ends of the XOR gate 116 are the instruction input end 112 and feedback end 113 of the logic unit 11 for judging the action of the electric gripper 20 corresponding to the feedback signal $S_C$ and the action of the electric gripper 20 corresponding to the action instruction $S_N$ to be consistency or non-consistency.

In this embodiment, the logic unit 11 consists of the AND gate 115 and the XOR gate 116, however, in actual application, the logic unit 11 may consist of more logic components (OR gate, AND gate, NAND gate, XOR gate, etc.), therefore, the design of the logic unit 11 is not limited to the configuration indicated in the present preferred embodiment.

Figure 3:
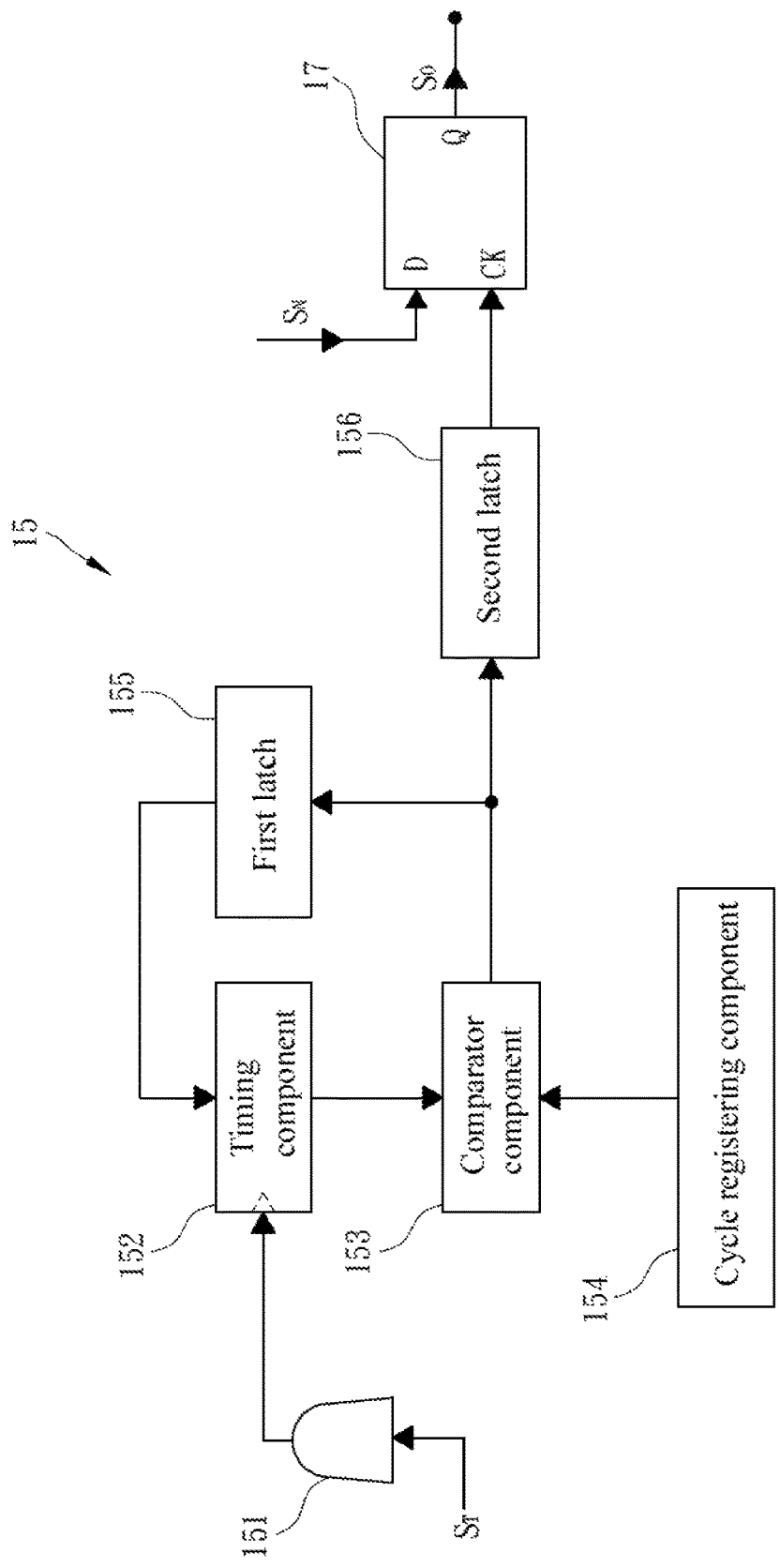
FIG. 3 is a circuit block diagram of the timer of the driver device in accordance with the present invention.

As illustrated in FIG. 3, the timer 15 comprises an AND gate 151, a timing component 152, a comparator component 153, a cycle registering component 154, a first latch 155 and a second latch 156. The AND gate 151 of the timer 15 receives the timing trigger signal that is outputted by the logic unit 11, and then triggers the timing component 152, causing the timing component 152 to start counting and accumulating counts. In actual application, the timing component 152 can be a register. Thereafter, the comparator component 153 compares the value of the counts accumulated by the timing component 152 with a predetermined value pre-stored in the cycle registering component 154, and then outputs a signal to the first and second latches 155,156 when the accumulated value is equal to the predetermined value. Thereafter, the first latch 155 resets the value of the timer 15, i.e., zeroes the counting of the timing component 152, and at the same time, the second latch 156 triggers the flip-flop 17. In this embodiment, every component of the timer 15 can be formed of multiple logic elements, or multiple active and passive devices, or achieved by a software program. These techniques are of the known art, no further detailed description in this regard will be necessary.

Further, because the driver device of the present invention utilizes the logic unit to judge the state of the electric gripper and to determine the output of a new action instruction according to the current state of the electric gripper, the driver device of the present invention can drive the electric gripper without using a trigger circuit (logic) signal and a time-series planning logic.

Further, the timer of the processing unit is adapted for delaying the output of a new action instruction, avoiding generation of noises during switching between two action instructions to further cause an action error, therefore, the timer can be regarded as a filter. Further, if switching between the two actions does not cause generation of noises, the processing unit can be composed of simply one flip-flop, and the timer (filter) can be omitted, the logic unit directly triggers the flip-flop of the processing unit to output an action instruction. Therefore, the processing unit is not limited to the design illustrated in the present preferred embodiment, it can be composed of any other device that can be triggered by the logic unit to output an action instruction.

Figure 4:
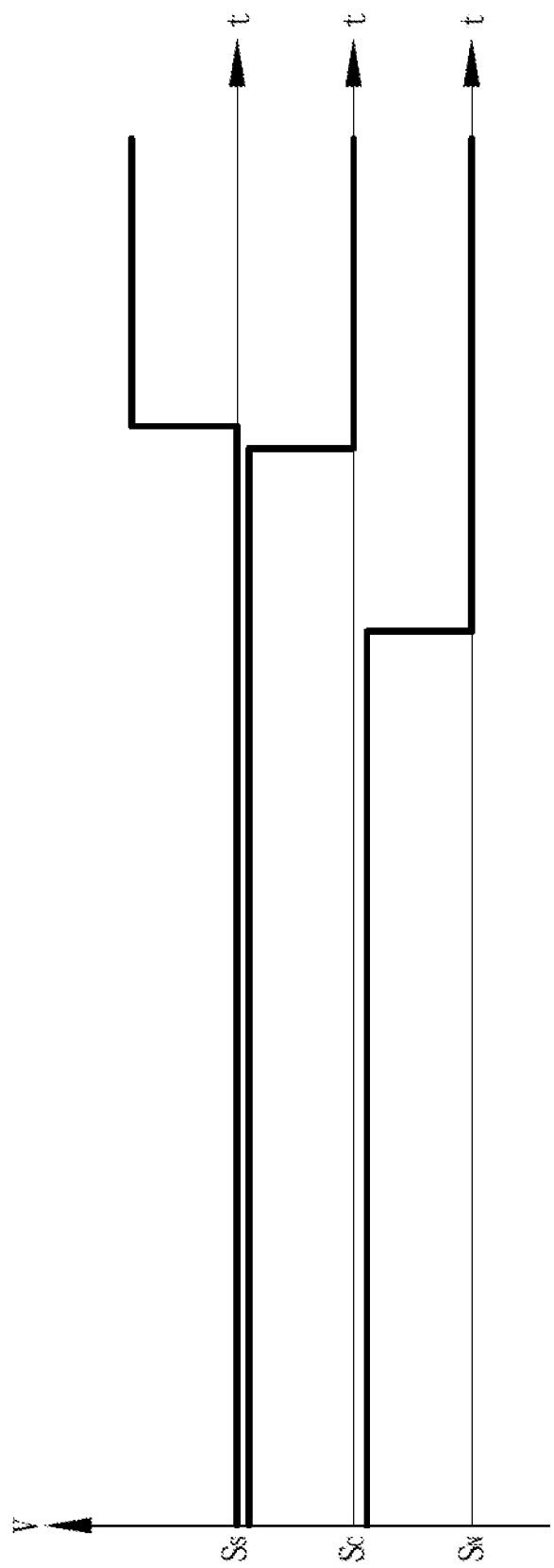
FIG. 4 is a voltage level time series chart of the state signal, action instruction and feedback signal of the driver device in accordance with the present invention.

As illustrated in FIG. 4, in an example of the present invention, the state signal $S_S$, the feedback signal $S_C$ and the action instruction $S_N$ are indicative of a voltage level. If the electric gripper is in the idle state, the state signal $S_S$ is Low Level. If the electric gripper is not in the idle, the state signal $S_S$ is High Level. If the action instruction for the electric gripper is "open", this action instruction is High Level. If the action instruction for the electric gripper is "close", this action instruction is Low Level. In the present preferred embodiment, if the state signal $S_S$ is Low Level, the electric gripper is judged to be in the idle state, on the contrary, if the state signal $S_S$ is High Level, the electric gripper is judged not to be in the idle state.

When the state signal $S_S$ of the electric gripper is Low Level (idle state), the logic unit receives an action instruction $S_N$ (Low Level) for driving the electric gripper to close, the action instruction $S_N$ changes from High Level to Low level. At this time, the feedback signal $S_C$ (High Level) indicates the electric gripper in the "open" state, the action indicative of the action instruction $S_N$ is not in consistency the action indicative of the feedback signal $S_N$, the logic unit triggers the processing unit to delay the output of the action instruction, thus, the feedback signal $S_N$ changes from High Level to Low Level, indicating that the electric gripper changes its direction, however, the state signal $S_S$ changes from Low Level to High Level and will return to the idle state only after execution of the action instruction.

Further, except the time series chart shown in FIG. 4, the state signal $S_S$, the feedback signal $S_C$ and the action instruction $S_N$ further include three other time series that will be subsequently described. If the logic unit receives an action instruction (High Level) for driving the electric gripper to open and a feedback signal (Low Level) indicative of the "close" action of the electric gripper when the state signal of the electric gripper is Low Level (idle state), the action indicative of the action instruction is not in consistency with the action indicative of the feedback signal, at this time, the logic unit triggers the processing unit to delay the output of the action instruction.

If the logic unit receives an action instruction (High Level) for driving the electric gripper to open, and a feedback signal (High Level) indicative of the "open" action of the electric gripper, and the state signal of the electric gripper is Low Level (idle state), the action indicative of the action instruction is not in consistency with the action indicative of the feedback signal, at this time, the logic unit does not trigger the processing unit, and thus, the processing unit does not output any action instruction.

Further, if the logic unit receives an action instruction (Low Level) for driving the electric gripper to close, and a feedback signal (Low Level) indicative of the "close" action of the action instruction, and the state signal of the electric gripper is Low Level (idle state), the logic unit does not trigger the processing unit, and thus, the processing unit does not output any action instruction.

In this embodiment, the logic unit will trigger the processing unit to output an action instruction only when the electric gripper is at the idle state and when the action indicative of the feedback signal is reversed to the action indicative of the action instruction. Thus, the logic unit can also be composed of other logic components. Further, the number of logic components is not limited to the design of the present preferred embodiment. Further, the logic decision of the logic unit on the voltage level of the signal and instruction is not limited to the method described in the present preferred embodiment.

Figure 5:
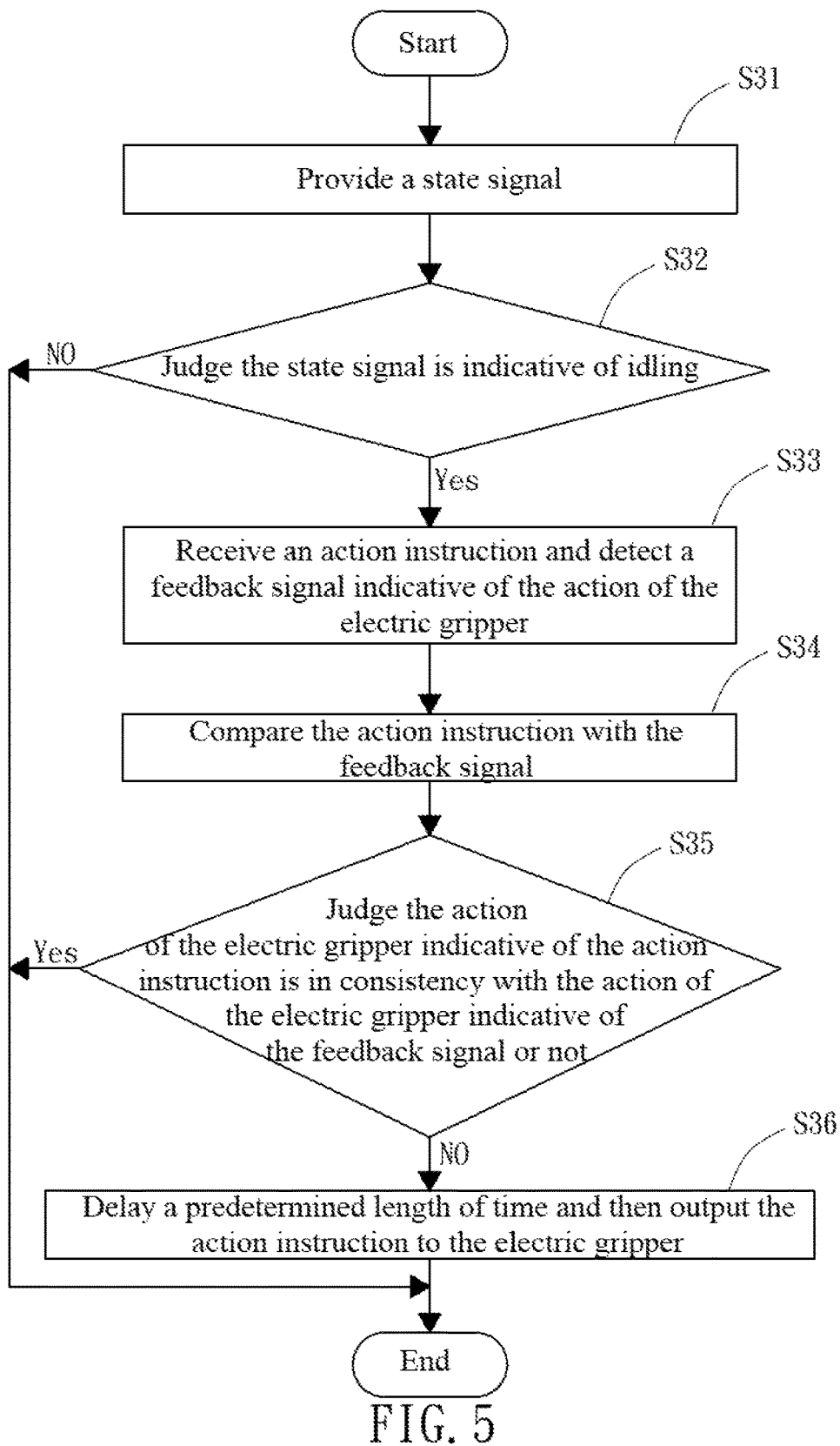
FIG. 5 is a flow chart of a driving method for a driver device for driving an electric gripper in accordance with the present invention.

As illustrated in FIG. 5, the method for driving the electric gripper in accordance with the present invention comprises the steps of:

At first, execute step S31: Provide a state signal that is generated according to the operation state of the electric gripper; and then execute step S32: Judge the state signal is indicative of a state of idle or not. If the state signal is not indicative of a state of idle, it means the electric gripper is in motion, i.e., the electric gripper is executing the last action instruction, end the step without outputting a new action instruction to the electric gripper. Further, in step S31, the technique for generating the state signal is of the known art, no further detailed description in this regard will be necessary.

If the state signal is indicative of a state of idle, it means the electric gripper is idling or not in motion, thus, execute step S33: Receive an action instruction and detect a feedback signal corresponding to the action of the electric gripper, wherein the detection of the feedback signal corresponding to the action of the electric gripper can be continuously performed, or executed only after generation of a new action instruction.

The feedback signal has a great concern with the operation state of the electric gripper. The action instruction can be an instruction for driving the electric gripper to perform the action of "open" or the action of "close". The feedback signal is to feed back the direction of action of the electric gripper. There are two directions for the action of the electric gripper. These two directions have a great concern with the action of "open" and the action of "close" of the electric gripper.

Thereafter, execute step S34: Compare the action instruction with the feedback signal. And then, execute step S35: Judge the action of the electric gripper indicative of the action instruction to be in consistency with or not in consistency with the action of the electric gripper indicative of the feedback signal. The consistency in action here means that the action of the electric gripper indicative of the action instruction and the action of the electric gripper indicative of the feedback signal both are the action of "open" or "close". The non-consistency in action here means that the action of the electric gripper indicative of the action instruction and the action of the electric gripper indicative of the feedback signal are of different actions, or of the same action but both vary in degree, for example, the action of the electric gripper indicative of the action instruction and the action of the electric gripper indicative of the feedback signal both are the action of "open", however, the degree of opening indicative of the action instruction is larger than the degree of opening indicative of the feedback signal.

If in consistency, it means that the direction of the action of the electric gripper indicative of the feedback signal and the direction of the action of the electric gripper indicative of the action instruction are the same, for example, the new action instruction is indicative of the action of the electric gripper to perform the action of "open" (or "close"), and the feedback signal is also indicative of the current action of the electric gripper to be the action of "open" (or "close"), thereafter, end the step without outputting an action instruction.

If not in consistency, it means that the direction of the action of the electric gripper indicative of the feedback signal is different with the direction of the action of the electric gripper indicative of the action instruction, for example, the new action instruction is indicative of action of the electric gripper to perform the action of "open" (or "close"), and the feedback signal is indicative of the current action of the electric gripper to be the action of "close" (or "open"), thus, execute step S36: Output the action instruction to the electric gripper after a predetermined time delay, enabling the electric gripper to change the direction of motion.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A driver device for driving an electric gripper, comprising:
   a logic unit comprising a state detection end, an instruction input end, a feedback end and a logic output end, said state detection end being adapted for generating a state signal according to an operation state of said electric gripper, said instruction input end being adapted for receiving an action instruction for driving said electric gripper to perform an action; and a processing unit comprising two input ends and an output end, said two input ends of said processing unit being respectively electrically coupled to said instruction input end and said logic output end of said logic unit, said output end of said processing unit being electrically coupled to said feedback end of said logic unit, said feedback end of said logic unit being adapted for generating a feedback signal according to an action of said electric gripper, said processing unit outputting said action instruction when said state signal is indicative of an idle state of said electric gripper and when said logic unit judges that the action of said electric trigger indicative of said feedback signal is not in consistency with the action of said electric gripper indicative of said action instruction;

wherein said logic unit comprises an AND gate and an XOR gate, said AND gate comprising an output end that is the said logic output end of said logic unit, a first input end electrically coupled to an output end of said XOR gate and a second input end that is the said state detection end of said logic unit, said XOR gate comprising two input ends respectively electrically coupled to said instruction input end and said feedback end of said logic unit and adapted for judging the action of said electric gripper indicative of said feedback signal to be in consistency with the action of said electric gripper indicative of said action instruction or not.

2. A driver device for driving an electric gripper, comprising:

a logic unit comprising a state detection end, an instruction input end, a feedback end and a logic output end, said state detection end being adapted for generating a state signal according to an operation state of said electric gripper, said instruction input end being adapted for receiving an action instruction for driving said electric gripper to perform an action; and a processing unit comprising two input ends and an output end, said two input ends of said processing unit being respectively electrically coupled to said instruction input end and said logic output end of said logic unit, said output end of said processing unit being electrically coupled to said feedback end of said logic unit, said feedback end of said logic unit being adapted for generating a feedback signal according to an action of said electric gripper, said processing unit outputting said action instruction when said state signal is indicative of an idle state of said electric gripper and when said logic unit judges that the action of said electric trigger indicative of said feedback signal is not in consistency with the action of said electric gripper indicative of said action instruction, wherein said processing unit comprises a timer and a flip-flop, said timer being electrically coupled to said logic output end of said logic unit, said flip-flop comprising two input ends respectively electrically coupled to said timer and said instruction output end of said logic unit and an output end electrically coupled to said feedback end of said logic unit and adapted for outputting said action instruction.

3. The driver device as claimed in claim 2, wherein said timer is adapted for driving said flip-flop to delay outputting said action instruction.

4. The driver device as claimed in claim 2, wherein said timer comprises an AND gate, a timing component, a comparator component, a cycle registering component, a first latch and a second latch, said AND gate of said timer being adapted for receiving said timing trigger signal from said logic unit and then triggering said timing component to start counting and to accumulate the counts, said comparator component being adapted for comparing the value of the counts accumulated by said timing component with a predetermined value pre-stored in said cycle registering component, when the accumulated value is equal to said predetermined value, said comparator component outputting a signal to said first latch and said second latch, said first latch being enabled to reset the value of said timer, said second latch being to trigger said flip-flop.

5. A driving method used in a driver device for driving an electric gripper, the driving method comprising the steps of:

providing a state signal, said state signal being generated according to an operation state of said electric gripper;

receiving an action instruction and detecting a feedback signal indicative of an action of said electric gripper when said state signal is an idle state; and delaying a predetermined length of time to outputting said action instruction if the action of said electric gripper indicative of said action instruction is not in consistency with the action of said electric gripper indicative of said feedback signal.

6. The driving method as claimed in claim 5, further comprising the step of stopping from outputting said action instruction if the action of said electric gripper indicative of said action instruction is in consistency with the action of said electric gripper indicative of said feedback signal.

* * * * *